198-445 SR
8/4/87 OR H 000,318

United States Statutory Invention Registration [19]

[11] Reg. Number: H318
[43] Published: Aug. 4, 1987

Mims

[54] ROTARY GUIDE DEVICE

[75] Inventor: Herman D. Mims, Charlotte, N.C.

[73] Assignee: Machine Builders and Design, Inc., Shelby, N.C.

[21] Appl. No.: 925,506

[22] Filed: Oct. 30, 1986

Related U.S. Application Data

[63] Continuation of Ser. No. 406,818, Aug. 10, 1982, abandoned, which is a continuation-in-part of Ser. No. 175,480, Aug. 5, 1980, abandoned.

[51] Int. Cl.[4] ..... B65G 47/12
[52] U.S. Cl. ..... 198/446

[56] References Cited

U.S. PATENT DOCUMENTS

| | | | |
|---|---|---|---|
| 2,187,842 | 1/1940 | Rheinstrom | 198/445 |
| 2,935,173 | 5/1960 | Cozzoli | 198/445 |
| 3,232,411 | 2/1966 | Kulig | 198/446 |
| 3,682,291 | 8/1972 | Lent | 198/446 |
| 4,042,100 | 8/1977 | Morrone | 198/446 |

FOREIGN PATENT DOCUMENTS

| | | | |
|---|---|---|---|
| 1163026 | 9/1969 | United Kingdom | 198/445 |

*Primary Examiner*—Deborah L. Kyle
*Assistant Examiner*—Michael J. Carone
*Attorney, Agent, or Firm*—Sughrue, Mion, Zinn, Macpeak & Seas

[57] ABSTRACT

A rotary guide device is used in conjunction with a conveyor belt adapted to have a plurality of randomly positioned articles thereon which must be aligned with each other in a plurality of rows lengthwise of and spaced across the conveyor belt by a plurality of guide plates positioned in essentially parallel lanes across and suspended above the moving conveyor belt. The rotary guide device is comprised of a plurality of rotating spindles disposed directly in front of each guide plate adjacent the upstream end thereof relative to the direction of movement of the belt. Each spindle is motor driven so that when contacted by an article on the moving conveyor belt the rotating spindle will direct the article into an adjacent channel between the guide plates to prevent jamming of the articles at the entrance to the channel. Each rotating spindle may be provided with a suitable friction surface to assist in positively directing an article in engagement therewith. The spindles and associated guide plates may be positioned along a line normal to the direction of belt travel or, preferably, are positioned along at least one skew line slanting across the belt.

7 Claims, 10 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ROTARY GUIDE DEVICE

This is a continuation of application Ser. No. 406,818, filed Aug. 10, 1982 now abandoned which is a continuation-in-part of application Ser. No. 175,480, filed Aug. 5, 1980 now abandoned.

BACKGROUND OF THE INVENTION

1. Field of the Invention

The present invention is directed to a rotary guide device, more specifically to a plurality of rotating spindles disposed adjacent the entrance to a plurality of channels defined by guide plates located along essentially parallel lines and positioned above a moving conveyor belt to assist in directing articles on said conveyor belt into said channels.

2. Prior Art

The problem of aligning a plurality of articles on a moving conveyor belt is generally accomplished by providing a plurality of guide plates which are suspended above the conveyor belt and which are spaced apart to define a plurality of channels. Such an arrangement is shown in U.S. Pat. No. 2,753,037 to Davis. However, there is nothing in Davis to prevent the jamming of bottles at the entrance to the individual channels defined between the guide plates 36.

A similar arrangement is provided in U.S. Pat. No. 2,187,842 granted to Rheinstrom wherein alternating guide plates are of different lengths in an effort to prevent jamming of the articles at the entrance to the channels defined by the guide plates. While such an arrangement reduces the chances of jamming, it is still possible for the articles to become jammed at the entrances to the various channels.

U.S. Pat. No. 2,791,315 granted to Chapman and U.S. Pat. No. 2,861,670 granted to Read et al. attempt to avoid jamming of the articles at the entrance to the channels by oscillating at least a portion of the channel. In Chapman all of the parallel guide plates are oscillated transversely of their length so that the entrances to the channels will move into alignment with the articles which are bunched together adjacent the entrances to the channels. Read et al on the other hand oscillates a plurality of elongated fingers in the plane of each guide plate adjacent the entrance to each channel defined between the guide plates in an attempt to prevent jamming of the articles at the entrance to the channels.

U.S. Pat. No. 3,599,789 granted to Kurczak is directed to a case sorting apparatus having hydraulically shiftable guide plates for diverting a single article along one of two possible paths. A central guide between the two paths is also oscillatable to assist in guiding the case and an idler roller is freely journaled at the lead end of the guide. The roller, however, merely acts as a passive guide since only one article is being sorted at a time so that a jamming of a plurality of articles does not occur.

U.S. Pat. No. 2,656,910 granted to Kraus et al is directed to a conveyor arrangement for diverting a plurality of cans on a central conveyor into two rows on a pair of outside conveyors. The plurality of guide belts are driven over pulleys arranged in a triangular pattern with the apex of the triangle being located centrally of the central conveyor. The belts along two opposite sides of the triangle are driven in opposite directions so as to guide the cans from the central conveyor to the outside conveyors. Such an arrangement however, is basically a simple diverting arrangement and will not prevent jamming if a large number of articles are supplied on the central conveyor simultaneously.

U.S. Pat. No. 2,877,883 granted to Lanham is directed to a bread handling apparatus comprising a system of conveyors having three units which receive the loaves in parallel side-by-side arrangement and rearranges them into two single columns of spaced loaves arranged lengthwise. Two pairs of loaves of bread disposed parallel to each other are diverted in opposite directions by two rotating spindles. The outermost loaf of each pair will then be disposed on a fast conveyor and the two adjacent loaves of each pair will be located in a slower conveyor. After a distance sufficient for the faster moving loaves to pass the slower moving loaves the two slower moving loaves will be diverted by means of two rotating spindles or discs onto the fast conveyor. Thus, the rotating spindles are for the sole purpose of shifting the loaves laterally from one conveyor to another. There are no guide plates against which the articles would jam.

U.S. Pat. No. 3,232,411 granted to Kulig is directed to a container handling apparatus comprising a conveyor belt leadiing to a rotating transfer disc across which a plurality of roughly aligned container units pass through one or two guide channels to be deposited in more precise alignment onto a second belt advancing in a different direction than the first belt. The guide channels are formed by one or more guide rails running continuously from the first belt across the disc onto the second belt. A pair of rotatable guide rollers, depicted in the drawing of Kulig along a line normal to the first conveyor belt, aid in driving the container into one or two guide channels and bumping others onto a return belt.

SUMMARY OF THE INVENTION

The present invention provides a new and improved rotary guide device to prevent jamming of a plurality of articles on a travelling conveyor belt as the articles are arranged into rows by a plurality of parallel guide plates extending in the direction of movement of the belt. The rotary guide device is comprised of a plurality of motor driven spindles each of which is located at the upstream end of each of a plurality of guide plates in direct alignment with the guide plates so that upon engagement of an article with the rotating spindle the article will be diverted laterally into alignment with one of the channels defined by the plurality of guide plates. The spindles may be operatively interconnected by means of sprockets and a common driven chain driven by a single motor or each of the spindles may be independently rotated by any suitable drive source.

More specifically, the present invention provides a guide device for aligning a plurality of articles, usually randomly positioned, on a moving conveyor into a plurality of columns solely in the direction of movement of the conveyor and maintaining said articles in columns advancing solely in the direction of conveyor movement without jamming said articles, the device comprising at least three stationary guide plates positioned across said conveyor and extending only substantially in the direction of movement of said conveyor and defining at least three unidirectional guide channels, a plurality of rotating spindles provided in spaced relation to each other along a line extending across said conveyor, with a spindle positioned at the upstream end of each of the guide plates in direct alignment with the guide plates, support means for rotatably supporting each spindle immediately above and adjacent to the conveyor and drive means for rotating each spindle so as to forcibly divert an article on said moving conveyor which comes into engagement with the rotating spindle into one of said guide channels.

The guide plates and associated spindles can be positioned along a line substantially normal to the direction of movement of the belt. However, it has been found that this type of arrangement still leads to some jamming as the articles enter the channels formed between the guide plates, particularly where one attempts to maximize the number of channels found across the belt, that is to have an individual channel only marginally wider than the width of the article being conveyed. In order to overcome this problem, in a preferred embodiment of the invention, the guide plates and associated spindles are laterally spaced downstream from one another along a line skewed to the direction of belt travel. Preferably, the skew angle formed between the skew line running between the spindles and a line orthogonal to the direction of conveyor movement, as defined in greater detail hereinafter, is at least 30°.

The present invention also includes process embodiments wherein there is provided a process for aligning and advancing a plurality of randomly positioned articles along a moving conveyor belt which comprises positioning at least three stationary, parallel guide plates across a moving conveyor belt, said guide plates extending only substantially in the direction of movement of the conveyor belt, thereby defining at least three guide channels on said belt, rotating a spindle having a vertically disposed axis of rotation in front of each of said guide plates, feeding a plurality of randomly positioned articles along said belt toward said guide channels, allowing said spindles to direct said articles into said channels without jamming said channels, aligning said articles into columns of articles by passage through said guide channels and then continuing to advance said columns of articles by said conveyor belt in the same direction of movement. Preferably, the guide plates and associated driven spindles are laterally spaced downstream from one another along a skew line as hereinbefore disclosed.

The foregoing and other objects, features and advantages of the invention will be apparent from the following more particular description of preferred embodiments of the invention as illustrated in the accompanying drawings.

BRIEF DESCRIPTION OF THE DRAWINGS

FIG. 6 depicts a single skew line; FIG. 7 depicts two skew lines; and FIG. 8 depicts two pairs of parallel skew lines.

DETAILED DESCRIPTION OF THE INVENTION

While the rotary guide device according to the present invention is usable in conjunction with a wide variety of products being aligned on a movable conveyor belt, the rotary guide device will be described as usable in conjunction with a plurality of cookies which have just been baked in an oven and are being moved along a conveyor system for cooling, sorting, further processing or packing. After the cookies have been baked in an oven, the cookies will be conveyed for relatively long distances in order to allow the cookies to cool before packaging. In some cases, it is required to transfer the cookies from one conveyor to another and in so doing the cookies become scattered on the conveyor belt. Such a random orientation of the cookies makes it difficult to direct the cookies into a plurality of guide channels defined by a plurality of guide plates suspended above the conveyor in order to align the cookies in columns in the direction of movement of the conveyor for subsequent packing or other operations.

Figure 1A:
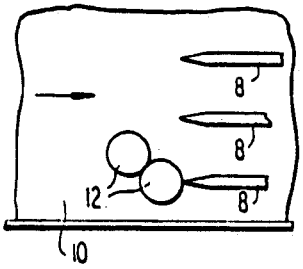
FIG. 1A PRIOR ART
FIGS. 1A, 1B and 1C are sequential, schematic views showing how jamming occurs with prior art guide devices associated with conveyor belts.
Figure 1B:
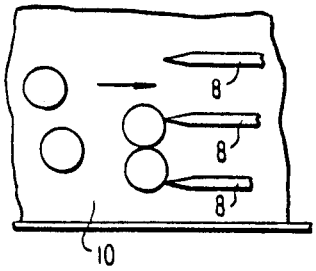
FIG. 1B PRIOR ART
Figure 1C:
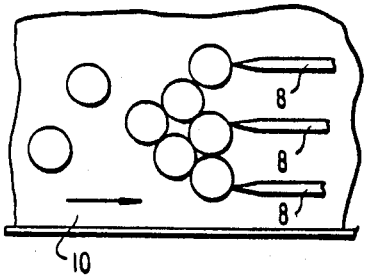
FIG. 1C PRIOR ART

A prior art arrangement is shown in FIGS. 1A, 1B and 1C wherein jamming of the cookies frequently occurs. A plurality of parallel guide plates 8 having tapered leading edges are suspended above a moving conveyor belt having a plurality of cookies 12 thereon. Ordinarily the cookies will move between adjacent plates 8 and become aligned in parallel columns. However, in FIG. 1A a cookie 12 has engaged the leading edge of a guide plate 8 directly thereby bringing the cookie to a halt while the conveyor belt continues to move other cookies toward the guide plates 8. As a result, it is possible for two adjacent cookies to become engaged on the leading edges of adjacent plates thereby completely blocking the entrance to a channel between adjacent plates as seen in FIG. 1B. Once such an initial blockage takes place, the continued arrival of cookies will very quickly lead to a major jamming or buildup of cookies at the entrance to the channels as defined by the guide plates 8 as seen in FIG. 1C.

Figure 2:
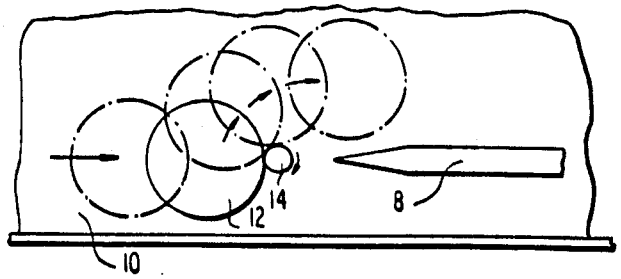
FIG. 2 is a schematic view showing the movement of an article on a conveyor upon engagement with a rotary guide device according to the present invention.

In order to prevent the cookies from being hung up on the leading edge of the guide plate the present invention broadly provides a rotatable spindle 14 located immediately in front of the tapered leading edge of each guide plate 8 as best seen in FIG. 2. Thus, when the cookie 12 on the moving conveyor 10 engages the rotating spindle 14, the frictional engagement between the cookie and the rotating spindle 14 will cause the cookie to move laterally as seen by the sequential phantom line illustration of the cookie in FIG. 2 thereby aligning the cookie with the channel between two adjacent guide plates.

Figure 3:
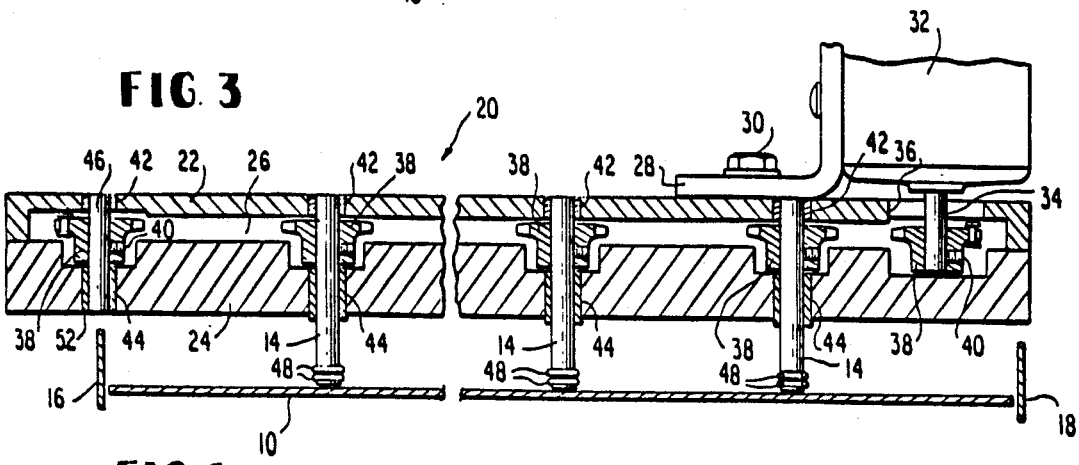
FIG. 3 is a transverse sectional view taken on the line 3—3 in FIG. 4 of a conveyor and rotary guide device according to the present invention.
Figure 4:
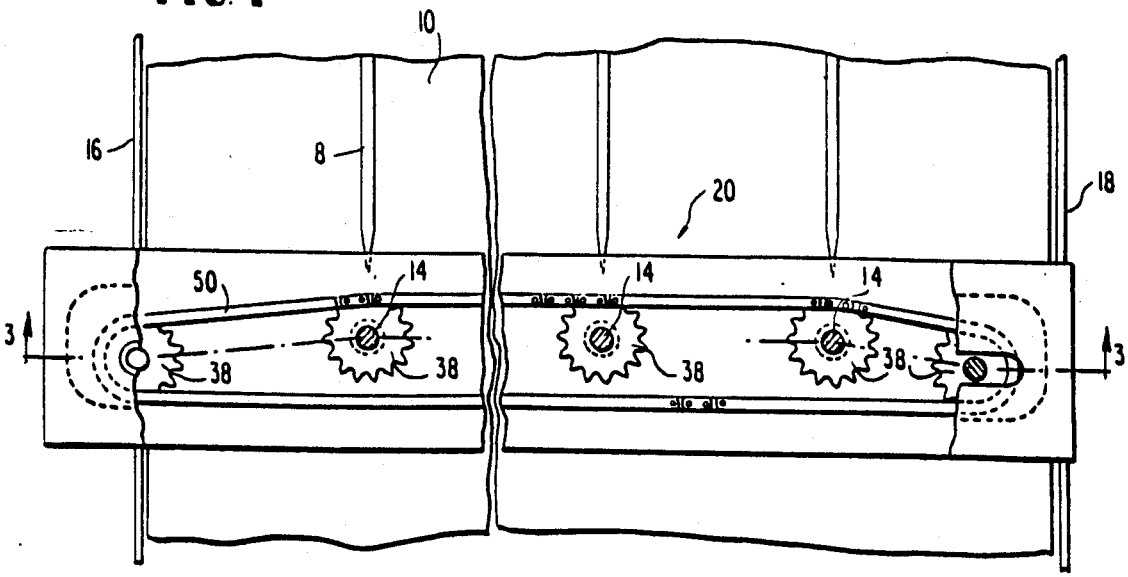
FIG. 4 is a top plan view of a conveyor and rotary guide device according to the present invention with a portion of the rotary guide device broken away for the sake of illustration.

Since a large number of parallel guide plates 8 would be associated with any given conveyor belt 10, a rotary guide device has been devised for supporting a plurality of rotating spindles above a moving conveyor belt with one rotating spindle being located in front of each guide plate as shown in FIGS. 3 and 4. The conveyor 10 is movable between a pair of side rails 16 and 18 and a plurality of spaced apart parallel guide plates 8 are suspended immediately above the surface of the conveyor belt 10 by any suitable support arm or the like. Since such supporting structures are old and well known in the art, they have not been illustrated in the present application.

The rotary guide device 20 is comprised of a rectangular housing having a top plate 22 and a bottom plate 24 which may be secured together by any suitable means to define a chamber 26 therein to accommodate the drive means for the rotating spindles. The upper plate 22 of the housing is secured to a bracket 28 by a bolt 30 and the bracket in turn may be secured to any suitable support means so that the housing will be suspended about the conveyor 10 transversely thereto. An electric motor 32 is also secured to the bracket 28 with its drive shaft 34 extending into the chamber 26 through an opening 36 in the upper plate 22. The toothed sprocket 38 is secured to the end of the drive shaft 34 by means of a set screw 40 or any other suitable means. The top plate 22 is provided with a plurality of apertures 42 and the bottom plate 24 is provided with a plurality of apertures 44 each of which is in alignment with a respective aperture 42. An idler shaft 46 is rotatably mounted in the aligned apertures 42, 44 furthest from the motor shaft 34 and a toothed sprocket 38 is secured thereto by means of a set screw 40. A rotary spindle 14 is rotatably mounted in each of the other pairs of aligned apertures 42, 44 with each spindle 14 having its lowermost end spaced in close proximity to the conveyor belt 10. While only three spindles 14 have been illustrated in FIG. 3, it is obvious that the number of spindles may be greater or less depending on the width of the belt and the number of columns into which the cookies are to be formed. Suitable friction means such as a pair of O-rings 48 may be secured in complementary grooves adjacent the bottom of each spindle 14 to assist in gripping the cookies and directing them laterally upon engagement. A toothed sprocket 38 is secured to each spindle 14 by means of set screw 40. The toothed portions of the sprockets 38 are disposed in a common plane with the axes of the spindles 14 being disposed in a line spaced from and parallel to a line interconnecting the axis of the idler shaft 48 and the motor shaft 34. A sprocket chain 50 is disposed in driving engagement with each of the sprockets 38 and due to the offset arrangement of the spindle shafts relative to the motor and idler shafts, all of the sprockets 38 will be driven in the same direction. Thus, all of the spindles 14 will be rotated in the same direction. Suitable anti-friction bearing means such as teflon sleeves 52 may be provided in each of the apertures 42 and 44.

While a chain and sprocket drive arrangement has been shown for rotating the spindles, it is also contemplated that each of the spindles could be driven from the motor shaft by means of suitable interengaged gearing or that each spindle could be driven separately by a plurality of small, independent motors associated with each spindle respectively. The direction of rotation of the spindles is not critical but it is preferable that all of the spindles rotate in the same direction to further reduce any possibility of jamming of the cookies at the entrance to the channels defined between the guide plates 8.

Figure 5:
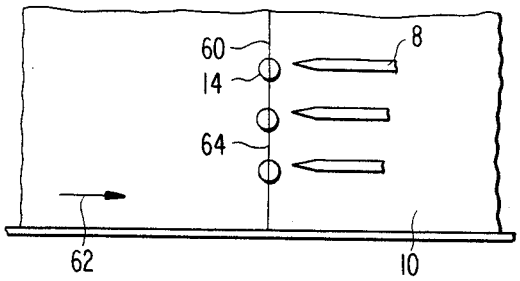
FIG. 5 is a schematic view of one embodiment of the present invention wherein the guide plates and associated spindles are positioned along a line normal to the direction of movement of the belt.

FIG. 5 of the Drawing depicts schematically an embodiment of this invention wherein spindles 14 and associated gates 8 are positioned essentially along a line 60 orthogonal to the direction of travel of the belt 10 as shown by the arrow 62. This arrangement, which can be usefully employed in some applications of the invention, can still lead to jamming wherein the width, i.e., the diameter of an essentially circular cookie, is nearly the same as the length of line segment 64 defining a gate between adjacent spindles. Of course, increasing the width of the gate leading into a guide channel between adjacent spindles reduces the number of guide channels which can be accommodated by a single conveyor belt. By skewing the positionment of the spindles across the belt, a maximum number of guide channels can be formed across an individual conveyor belt, while providing a longer gate 74 between adjacent spindles, as shown in FIG. 6.

Figure 6:
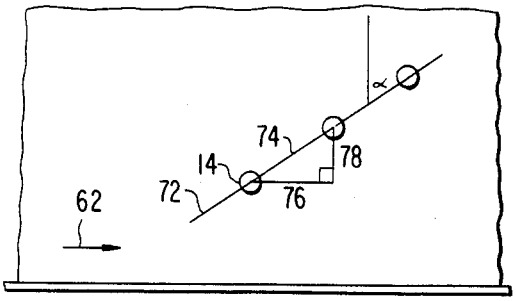
FIGS. 6, 7 and 8 are schematic views of three embodiments of the present invention wherein the guide plates and associated spindles are positioned along one or more skew lines slanting across the belt.

In FIG. 6, the spindles 14 are positioned along skew line 72. Segment 74 of skew line 72 is the hypotenuse of a right triangle formed by lines 74, 76 and 78. Therefore, the gate defined by line segment 74, is longer than the gate defined by line segment 64 of FIG. 5. In FIG. 6, line 78 defining transverse distance between adjacent spindles is the same length as line segment 64 of FIG. 5. Thus, although the width of the channels formed between adjacent guide plates will be the same in FIG. 6 as in FIG. 5, the entry distance between adjacent spindles leading into an individual guide channel has been significantly increased. This essentially prevents any jamming from occurring while allowing the width of an individual guide channel to be only marginally wider than the width of the article being conveyed.

In FIG. 6, the skew angle $\alpha$, formed between the skew line and a line orthogonal to the direction of belt travel is at least 30°, say 30° up to 75°, preferably less than 60°. Obviously, as the skew angle $\alpha$ increases, the gate length increases but a greater length of belt travel is required for aligning all columns of articles.

Figure 7:
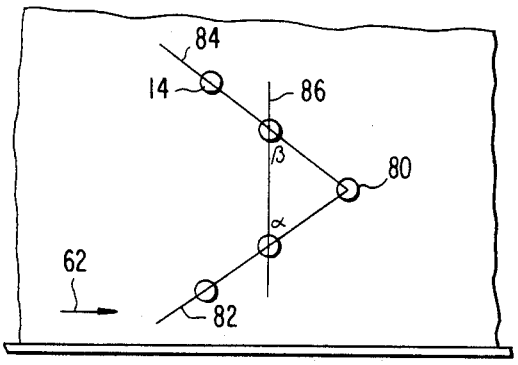

FIG. 7 depicts an embodiment of this invention wherein two series of spindles 14 are positioned so that the spindles of each series are laterally spaced downstream from one another along two lines 82 and 84 skewed to the direction of belt travel, with the lines meeting at a common spindle 80. Skew angles $\alpha$ and $\beta$ are each at least 30°, but less than about 75° to a line 86 orthogonal to the direction of belt travel.

Figure 8:
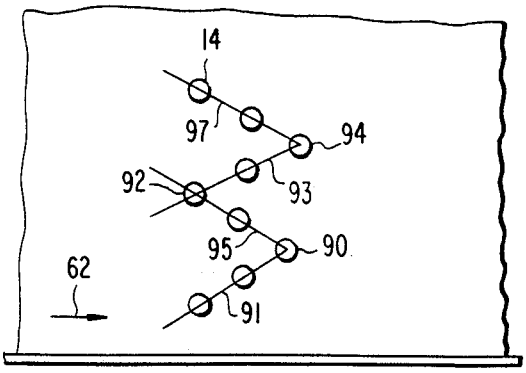

In FIG. 8, four series of laterally spaced apart spindles are positioned so that the spindles 14 of each series are downstream of one another, with adjacent series of spindles having a common spindle 90, 92 or 94. Again, each skew angle is about 30° to 75°, as above disclosed. In FIG. 8, skew lines 91 and 93 are parallel lines, as are skew lines 95 and 97.

In FIGS. 5 through 8, side guide rails are not shown and in FIGS. 6 through 8 guide plates are not shown. Arrangements, such as those of FIGS. 7 and 8, particularly where there are at least two lines of spindles skewed across the belt, with a spindle common to two adjacent series of spindles, provides the longer gate openings while minimizing the belt length along which the spindles are positioned.

Preferably, all of the rotatable spindles associated with guide plates are rotated in the same direction so that only one spindle directs articles into a specific guide channel. In this manner, two spindles do not direct articles into the same guide channel, which aids in prevention of jamming.

While the invention has been particularly shown and described with reference to preferred embodiments thereof, it will be understood by those in the art that various changes in form and details may be made therein without departing from the spirit and scope of the invention. For example, additional spindles, not associated with guide plates could be employed, such as along the guide rails. Of course, such auxiliary spindles need not rotate in the same direction as the spindles associated with the guide plates.

What is claimed is:

1. A guide device for alinging a plurality of substantially flat articles on a moving conveyor into a plurality of columns on the conveyor without jamming said articles, comprising; plural stationary guide plates positioned over said conveyor and extending in the direction of movement of said conveyor and defining plural unidirectional guide channels, a plurality of rotating spindles provided in spaced relation to each other and forming a series of spindles extending across said conveyor, with a spindle positioned at the upstream end of each of the guide plates in direct alignment with respective guide plates, means for rotatably supporting each spindle immediately above and adjacent to the conveyor, and drive means for rotating each spindle so as to forcibly divert an article on said moving conveyor which comes into engagement with a rotating spindle into a specific adjacent one of said guide channels, each guide channel being associated with a respecitve spindle, said guide plates having forward ends positioned along a line extending generally transversely to the direction of belt travel and defining therebetween gate widths, and said spindles being arranged upstream of the forward ends of said guides plates, and being positioned along at least one line skewed to the direction of belt travel to thereby icrease lengths of said gates, said skewed line forming an angle of 30 to 75 degrees with a line orthogonal to the direction of belt travel.

2. A guide device as in claim 1 wherein there are at least two series of spindles positioned along two skew lines, with the spindles of each series being spaced from one another along the length of the conveyor.

3. A guide device as in claim 2 wherein said two series of spindles include a common spindle.

4. A guide device as in any of claims 1, 2 and 3, further comprising friction means secured to the lower end of each spindle for engagement with artiles on said conveyor.

5. A guide device as in any of claims 1, 2 and 3, said drive means comprising common drive means for simultaneously rotating each of said spindles in the same direction.

6. A guide device as in claim 5 wherein said common drive means includes an electric motor mounted on said support means, said motor having a drive shaft disposed parallel to said spindles, sprocket means secured to said shaft and said spindles in a common plane and a sprocket chain engaging each of said sprockets for imparting the rotation of said motor shaft to each of said spindles.

7. A process for aligning and advancing a plurality of randomly positioned substantially flat articles along a moving conveyor belt, comprising; positioning at least three stationary, parallel guide plates across a moving conveyor belt such that forward ends of said guide plates are positioned along a line generally transverse to said conveyor belt and defining therebetween gate widths, said guide plates extending substantially only in the direction of movement of the conveyor belt, thereby defining at least three guide channels on said belt, disposing a rotating spindle having a vertically disposed axis of rotation in front of each of said guide plates, said spindles being collectively disposed along at least one line skewed to the direction of conveyor belt travel, to increase lengths of said gates, feeding a plurality of randomly positioned articles along said belt toward said guide channels, allowing said spindles to each direct said articles into one specific adjacent channel, respectively, without jamming said channels, aligning said articles into columns of articles by passage through said guide channels and then continuing to advance said columns of articles by said conveyor belt in the same direction of movement.

* * * * *